Patented Sept. 22, 1936

2,055,269

UNITED STATES PATENT OFFICE 2,055,269

PROCESS FOR THE MANUFACTURE OF ALCOHOLS

Adrianus Johannes Van Peski and Siegfried Leonard Langedijk, Amsterdam, Netherlands, assignors to Shell Development Company, San Francisco, Calif., a corporation of Delaware No Drawing. Application December 31, 1934, Serial No. 760,020. In Great Britain May 23, 1929

10 Claims. (Cl. 260—156)

Our invention relates to a process for the manufacture of alcohols by converting olefines into the corresponding alcohols by means of water.

It is already known to prepare ethyl alcohol by combining ethylene with water according to the equation $$C_2H_4 + H_2O \rightarrow C_2H_5OH.$$

It is also known to perform the aforesaid reaction in the liquid phase by absorbing the olefine in sulfuric acid and thereafter converting the sulfuric ester obtained into alcohol. It has further been proposed to carry out the hydration process mentioned above in the vapor phase under high pressure and in the presence of catalysts.

We have now found that the hydration of olefines may be effected even at ordinary pressures and with satisfying yields, if the reactions are carried out in the presence of certain catalysts.

According to our invention, the hydration process is effected at a temperature of at least 100° C. by combining one or more olefines with water in the vaporous state in the presence of a compound of a metal having a dehydrogenating action, preferably of a metal of the platinum group, or of gold, silver, copper, iron, nickel, or tantalum, which compound does not yield the metal under reaction conditions. Metal salts of their weak inorganic acids as boric, pyrophosphoric, molybdic, tungsten acids, etc. may often be used to great advantage as catalysts. Salts of this type are, for instance, copper vanadate or copper phosphate. It is sometimes advantageous to employ mixtures of any of the above-mentioned substances with or without cobalt, chromium, vanadium or tungsten or compounds thereof. Very good results are obtained when ethylene is hydrated as described in the presence of mixtures of anhydrous tungstic acid ($H_2WO_4$) and iron oxide, or in the presence of mixtures of anhydrous tungstic acid ($H_2WO_4$) with any of the vanadates of platinum, gold, copper or tantalum. Mixtures of copper oxide and anhydrous tungsten oxide or copper vanadate are very suitable catalysts for the hydration of propylene.

The catalysts used according to our invention are preferably used in a finely divided state, for instance finely divided on a suitable carrier such as porous substances, e. g. silica gel, pumice stone, active carbon, phosphates, pyrophosphates, alum earths and the like.

The catalysts according to our invention may also be used together with small quantities of promoters.

The following examples serve to illustrate how our invention may be carried into effect.

Example I 5 grams of copper phosphate are mixed with water, while stirring to a pasty mass. To this mass 100 cc. of a porous stone, the grains of which had a diameter of about 2 mms. are added. While stirring, the mass is slowly dried and then placed in a tube in which it is further dried at approximately 150° C. At a temperature of 155° C. and at a gas velocity of one quarter of a liter per hour, ethylene is conducted over the catalyst, prepared as stated above, and a considerable portion thereof is converted into ethyl alcohol.

Example II

A mixture of 15 grams of cupric oxide and 15 grams of tungsten trioxide $WO_3$ is brought on to 150 grams of active carbon. Over this mass propylene and water vapor are conducted at a velocity of 6.7 ccs. per second per cc. of apparent catalyst space at 300° C. The outflowing gases on condensation yield aqueous propyl alcohol. If the temperature of the reaction is raised to 400° C. besides isopropyl alcohol a considerable quantity of acetone is also formed.

It is possible that, when working with the catalysts according to our invention, a certain amount of aldehydes or ketones may be formed, owing to the dehydrogenating action of the catalysts on the alcohols which are the chief product. By a suitable choice of gas velocity and temperature the formation of ketones and aldehydes may be promoted or avoided, as illustrated in Example II.

It should be observed that it is a highly important and new feature of the process according to this invention that it allows the manufacture of alcohols direct from olefines and water at ordinary pressure due to the high activity of the catalysts used. Up till now the hydration of olefines could only be effected under high pressure notwithstanding certain catalysts being employed, which of course made it necessary to use expensive apparatus and rendered the process uneconomical in comparison with the process of this invention which may be carried out under ordinary pressure.

It should be understood, however, that our invention is not limited to the application of normal pressure, but that also a higher pressure may be used, if desirable.

In consequence of the high activity of the catalysts which are employed according to our inventiontion, it is also possible to perform the reaction at a considerably lower temperature than usual in the hitherto known processes of this kind.

It should be further understood that our invention comprises the conversion of other olefines as well as ethylene such as propylene, butylene and the like and also the conversion of olefines containing two or more double bonds in the molecule into the corresponding alcohols.

This invention is a continuation-in-part of our application, Serial No. 453,403, filed May 17, 1930.

We claim as our invention:

1. A method of manufacturing alcohol by hydrating the corresponding olefine having at least one double bond in the molecule which comprises combining the olefine with water in the vapor state at a temperature of at least 100° C. in the presence of at least one solid hydrating catalyst compound of a metal of the group consisting of metals of the platinum group, or of gold, silver, copper, iron, nickel and tantalum, which compounds do not yield the metal under reaction conditions.

2. A method as set forth in claim 1, in which the reaction is carried out at substantially atmospheric pressure.

3. A method of manufacturing alcohol by hydrating the corresponding olefine having at least one double bond in the molecule which comprises combining the olefine with water in the vapor state at a temperature of at least 100° C. in the presence of at least one solid hydrating catalyst which is a weak inorganic salt of a metal of the class consisting of metals of the platinum group, or of gold, silver, copper, iron, nickel and tantalum, which metal salts of weak inorganic acids do not yield metal under reaction conditions.

4. A method of manufacturing alcohol by hydrating the corresponding olefine having at least one double bond in the molecule which comprises combining the olefine with water in the vapor state at a temperature of at least 100° C. in the presence of a solid copper salt of a weak inorganic acid which does not yield the metal under reaction conditions.

5. A method of manufacturing alcohol by hydrating the corresponding olefine having at least one double bond in the molecule which comprises heating the olefine with water in the vapor state at a temperature of at least 100° C. in the presence of a solid copper phosphate.

6. A method of manufacturing alcohol by hydrating the corresponding olefine having at least one double bond in the molecule which comprises heating the olefine with water in the vapor state at a temperature of at least 100° C. in the presence of a solid copper vanadate.

7. A method of manufacturing alcohol by hydrating the corresponding olefine having at least one double bond in the molecule which comprises heating the olefine with water in the vapor state at a temperature of at least 100° C. in the presence of a solid copper oxide.

8. A method of manufacturing alcohol by hydrating the corresponding olefine which comprises heating said olefine with water in the vapor state at a temperature of at least 100° C. in the presence of a solid substantially non-ionized salt of a heavy metal of the group consisting of the metals of the platinum group, gold, silver, copper, iron, nickel and tantalum which salt does not yield the metal under reaction conditions.

9. A method of manufacturing alcohol by hydrating the corresponding olefine which comprises heating said olefine with water in the vapor state at a temperature and at a pressure at which hydration of said olefine is effected in the presence of a solid salt of a heavy metal of the group consisting of the metals of the platinum group, gold, silver, copper, iron, nickel and tantalum, which salt does not yield the metal under reaction conditions.

10. A method of manufacturing alcohol by hydrating the corresponding olefine which comprises heating said olefine with water in the vapor state at a temperature and at a pressure at which hydration of said olefine is effected in the presence of a solid weak inorganic acid salt of a heavy metal of the group consisting of the metals of the platinum group, gold, silver, copper, iron, nickel and tantalum, which salt does not yield the metal under reaction conditions.

ADRIANUS JOHANNES VAN PESKI.
SIEGFRIED LEONARD LANGEDIJK.